(12) United States Patent
Kanno

(10) Patent No.: US 7,375,864 B2
(45) Date of Patent: May 20, 2008

(54) DOCUMENT READING APPARATUS AND IMAGING APPARATUS IMPLEMENTING SAME

(75) Inventor: Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1142 days.

(21) Appl. No.: 10/613,998

(22) Filed: Jul. 8, 2003

(65) Prior Publication Data

US 2004/0047007 A1 Mar. 11, 2004

(30) Foreign Application Priority Data

Jul. 10, 2002 (JP) ............................. 2002-201398

(51) Int. Cl.
*H04N 1/04* (2006.01)
*H04N 1/40* (2006.01)

(52) U.S. Cl. ...................... 358/483; 358/482; 358/461; 358/475

(58) Field of Classification Search ................ 358/483, 358/482, 475, 461, 509, 512, 514; 250/208.1
See application file for complete search history.

(56) References Cited

U.S. PATENT DOCUMENTS

| | | | |
|---|---|---|---|
| 5,408,113 A | 4/1995 | Kanno et al. | |
| 6,198,349 B1 | 3/2001 | Kanno et al. | |
| 6,278,490 B1 * | 8/2001 | Fukuda et al. | 348/362 |
| 6,426,804 B1 | 7/2002 | Kanno et al. | |
| 6,564,028 B2 | 5/2003 | Kanno | |
| 6,606,046 B2 | 8/2003 | Kanno | |
| 6,785,026 B1 * | 8/2004 | Terajima et al. | 358/509 |
| 7,071,979 B1 * | 7/2006 | Ohtani et al. | 348/269 |

FOREIGN PATENT DOCUMENTS

| | | |
|---|---|---|
| JP | 3-198468 | 8/1991 |
| JP | 10-285338 | 10/1998 |
| JP | 2001-238052 | 8/2001 |
| JP | 2001-273996 | 10/2001 |

* cited by examiner

*Primary Examiner*—Houshang Safaipour
(74) *Attorney, Agent, or Firm*—Oblon, Spivak, McClelland, Maier & Neustadt, P.C.

(57) ABSTRACT

A document reading apparatus arranged to reduce inconsistencies in the output signals of its linear image sensor is provided. The document reading apparatus includes a linear image sensor, a light source control circuit, and a light source driver. The light source control circuit has a pulse generator that generates control pulses having a prescribed frequency and a pulse period that is shorter than an accumulation period of the linear image sensor, the accumulation period being indicated by a timing signal that represents the accumulation period and a non-accumulation period. The light source control circuit also has a synchronization output unit that outputs a prescribed number of trigger pulses in synchronization with the timing signal and the control pulses. The light source driver drives the light source in response to the trigger pulses.

20 Claims, 9 Drawing Sheets

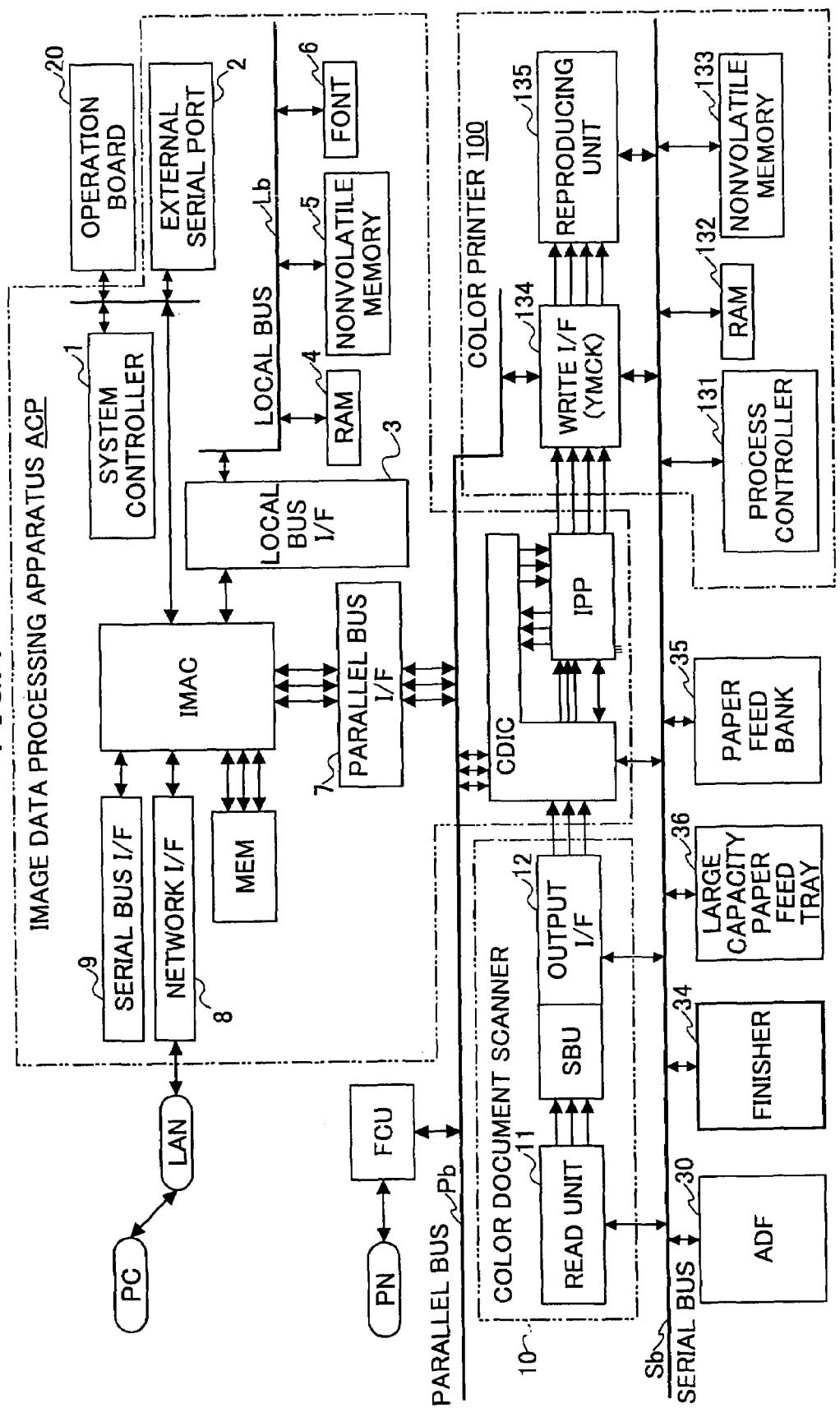

DOCUMENT READING APPARATUS AND IMAGING APPARATUS IMPLEMENTING SAME

BACKGROUND OF THE INVENTION

1. Field of the Invention

The present invention relates to a document reading apparatus that reads a document image and an imaging apparatus such as a scanner, a digital copier, or a facsimile machine that implements this document reading apparatus.

2. Description of the Related Art

In the conventional document reading apparatus, inconsistencies in the density representation values of output signals from a linear image sensor representing the same density may be due to, for example, an inconsistency in the initial light level of the light source, a short-term fluctuation of the light level, a long-term degradation of the light level (degradation over time), or an unevenness in sensor sensitivity, in the case of black-and-white image reading. Also, in the case of color image reading, inconsistencies in the output signals representing image density may be due to an inconsistency in the initial color level of the light source, a short-term fluctuation in the color level of the light source, or a long-term fluctuation of the color level of the light source, for example. Further, due to these inconsistencies and fluctuations, the maximum output may be approximately 6~7 times the minimum output.

Thus, in the conventional art, the above-described inconsistencies are compensated by performing variable gain amplification in an analog signal processing step implemented after the linear image sensor process. However, in the conventional technique, it is difficult to secure a stable density performance in such a wide dynamic range of the image signals, and also, a large load is imposed on the analog signal processing circuit thereby hindering the simplification of the analog signal processing unit.

In Japanese Patent Laid-Open Publication No.10-285338, a technique is disclosed in which the start up time of a document irradiating fluorescent lamp of a scanner is shortened, and after the start up time, the fluorescent lamp is driven with high frequency in order to stabilize the light level. Further, a PWM (pulse width modulation) control is performed upon driving the fluorescent lamp and the amount of light irradiated by the fluorescent lamp is detected with a photodiode. This detection result is compared with a light level standard signal and if it is determined that the amount of light is insufficient, the PWM duty is increased. On the other hand, if the light level is determined to be excessive, the duty is decreased. This up-down fluctuation of the duty is greater during start up than after the start up. The pulse period of the PWM pulse corresponds to the period of a line synchronization signal SYNC. The fluorescent lamp is driven by a high frequency during the earlier half of the accumulation time for a CCD to accumulate signals of one line. The high frequency lighting is turned off during the latter half of the accumulation time.

In Japanese Patent Laid-Open Publication No.2001-273996, an apparatus is disclosed in which two discharge lamps each having an inverter for providing a stable irradiation of high luminance light are interchangeably used.

According to the conventional art, when a fluorescent lamp is turned on and off through PWM control of an inverter lighting the lamp, a clock pulse from a counter determining the on pulse width of the PWM pulse and the high frequency high voltage applied to the fluorescent lamp by the inverter are not synchronized, and thereby, even if the duty of the PWM is the same, the amount of light irradiated by the fluorescent lamp within one period is uneven. That is, the amount of exposure is varied for each line.

SUMMARY OF THE INVENTION

It is an object of the present invention to reduce inconsistencies in the output signals of the linear image sensor implemented in an image reading apparatus.

To this end, the present invention provides a document reading apparatus including:

a light source for irradiating a document;

a linear image sensor for converting reflection light of the document into an electric signal;

a light source drive controller that includes a pulse generating unit for generating a plurality of control pulses having a period that is shorter than an accumulation period of the linear image sensor represented, the accumulation period being indicated by a timing signal that represents the accumulation period and a non-accumulation period, and a synchronization output unit for outputting a prescribed number of trigger pulses that are in synchronization with the timing signal and the control pulses; and a light source driver that is arranged to drive the light source in response to the trigger pulses.

According to this arrangement, the light source can be accurately driven according to the prescribed number of trigger pulses during an accumulation period of the linear image sensor. Thereby, unevenness in the light exposure during one accumulation period can be substantially eliminated, and the inconsistencies in the output signals of the linear image sensor can be reduced.

Additionally, the synchronization output unit of the above document reading apparatus may include a counter that is arranged to count the control pulses when a level of the timing signal is switched to a level representing the accumulation period and to generate a count signal after counting the pulses up to the prescribed number, and a gate for outputting trigger pulses that are in synchronization with the control pulses generated within a period from the time at which the counter starts counting the pulses to the time at which the count signal is generated.

According to this arrangement, the number of trigger pulses output within one accumulation period is controlled to a prescribed number by the counter. Thereby, the light source can be accurately driven according to the prescribed number of trigger pulses during one accumulation period of the linear image sensor.

Additionally, the pulse generating unit of the above document reading apparatus may be a variable frequency pulse generating unit that is arranged to generate control pulses having a variable frequency.

According to this arrangement, since the accumulation period is fixed, the number of trigger pulses output within one accumulation period can be determined unambiguously based on the frequency of the control pulses; that is, the prescribed number of trigger pulses can be output by manipulating the frequency of the control pulses. Also, in a case where the counter is used to control the number of trigger pulses by counting the trigger pulses output during an accumulation period and stopping the output of the trigger pulses after the prescribed number of trigger pulses have been counted, when the prescribed number of trigger pulses is increased, the frequency of the control pulses is increased so that a larger number of trigger pulses are output within the accumulation period and when the prescribed number of trigger pulses is decreased, the frequency of the control pulses is decreased so that a fewer number of trigger pulses are output. In this way, the number of trigger pulses can be precisely determined or controlled, and the light level of the light source can be precisely adjusted.

Further, the synchronization output unit of the above document reading apparatus may include a gate that is arranged to start outputting the trigger pulses in synchronization with the control pulses generated by the variable frequency pulse generating unit when a level of the timing signal is switched to a level representing the accumulation period and to stop the outputting of the trigger pulses when the level of the timing signal is switched to a level representing the non-accumulation period.

According to this arrangement, the gate synchronizes the trigger pulses with the accumulation period of the timing signal and the control pulses when outputting the trigger pulses, and thereby, the light source can be accurately driven according to the prescribed number of trigger pulses during an accumulation time of the linear image sensor, and the unevenness in the light exposure within one accumulation period can be substantially eliminated.

Additionally, the above document reading apparatus preferably includes a light level designating unit that is arranged to detect a brightness of the light source and to adjust the brightness of the light source to fall within a prescribed brightness range by setting at least one of the prescribed number of trigger pulses and the frequency of the control pulses to a value corresponding to the prescribed brightness range.

According to this arrangement, since the prescribed number of trigger pulses and/or the frequency of the control pulses are adjusted so that the brightness of the light source will be within a prescribed brightness range, inconsistencies in the document reading signals due to an unevenness in the initial light level of the light source, a short-term fluctuation of the light level, a long-term degradation of the light level (degradation over time), and an inconsistency in sensor sensitivity, for example, can be compensated so that high quality image data can always be obtained.

In another aspect, the present invention provides a document reading apparatus that includes:

a rod-shaped light source positioned parallel to one direction of a document to irradiate a document, a positional relation between the document and the light source being mechanically changeable so that an irradiated area on the document moves along the other side of the document;

a linear image sensor that converts a reflected light from the document into an electric signal corresponding to the intensity of the reflected light, and outputs the electric signal; and a light source drive circuit arranged to control an on/off time of the light source to be shorter than a time obtained from dividing an accumulation period of the linear image sensor by a value m (m>1) in order to alter an exposure light level of the linear image sensor.

According to this arrangement, a light level of the linear image sensor can be accurately controlled in a document reading apparatus implementing a light source with relatively high responsiveness to on/off control (e.g., halogen lamp). By generating lamp lighting signals more than once within one accumulation period, high frequency components of the consumption voltage can be increased since the consumption voltage of the light source drive circuit is released a plurality of times within the accumulation period. Thereby, a low pass filter inserted in a power source line can control the required power source voltage change at a faster time constant.

Alternatively, the light source may be a rod-shaped discharge tube driven by high voltage high frequency pulses; and the light source drive circuit may be arranged to directly control a number of the high voltage high frequency pulses supplied to the discharge tube light source within one accumulation time of the linear image sensor in order to alter an exposure light level of the linear image sensor.

According to this arrangement, the light level of the linear image can be controlled in a document reading apparatus having a light source that has relatively low responsiveness to on/off control (e.g., fluorescent lamp, cold cathode discharge tube). Further, in the case of performing on/off control of the light source using lighting control signals, the time base for generating the lighting control signals (normally Xtal oscillation) and the time base of the high frequency pulses directly driving the light source (normally RC oscillation) are different, and therefore, the number of the light source driving pulses generated during the lighting period does not necessarily correspond to the lighting control signals. However, according to this arrangement, the light source driving pulses are generated by the trigger pulses, and thereby, the number of the light source driving pulses can be accurately controlled. Also, although the exposure light level control realized by this arrangement is relatively rough, a wide control range can be provided.

Further, the light source drive circuit may be arranged to control a period of the high voltage high frequency pulses supplied to the discharge tube light source in order to alter an exposure light level of the linear image sensor.

According to this arrangement, a more detailed control of the exposure light level is possible.

In a further aspect, the present invention provides an imaging apparatus including the above described document reading apparatus;

an image processing apparatus that is arranged to convert image data output by the document reading apparatus into image output data; and an image reproducing unit that is arranged to reproduce an image on a sheet of paper based on the image output data.

According to this arrangement, by obtaining image data with very few inconsistencies in the density level representation from the document reading apparatus, reproduced image with high fidelity can be generated on the paper.

BRIEF DESCRIPTION OF THE DRAWINGS

Other objects, features, and advantages of the invention will become more apparent from the following detailed description when read in conjunction with the accompanying drawings, in which

FIG. 4 is a block diagram illustrating an image processing system of the imaging apparatus shown in FIG. 1;

DESCRIPTION OF THE PREFERRED EMBODIMENTS

In the following, preferred embodiments of the present invention are described with reference to the accompanying drawings.

First Embodiment

Figure 1:
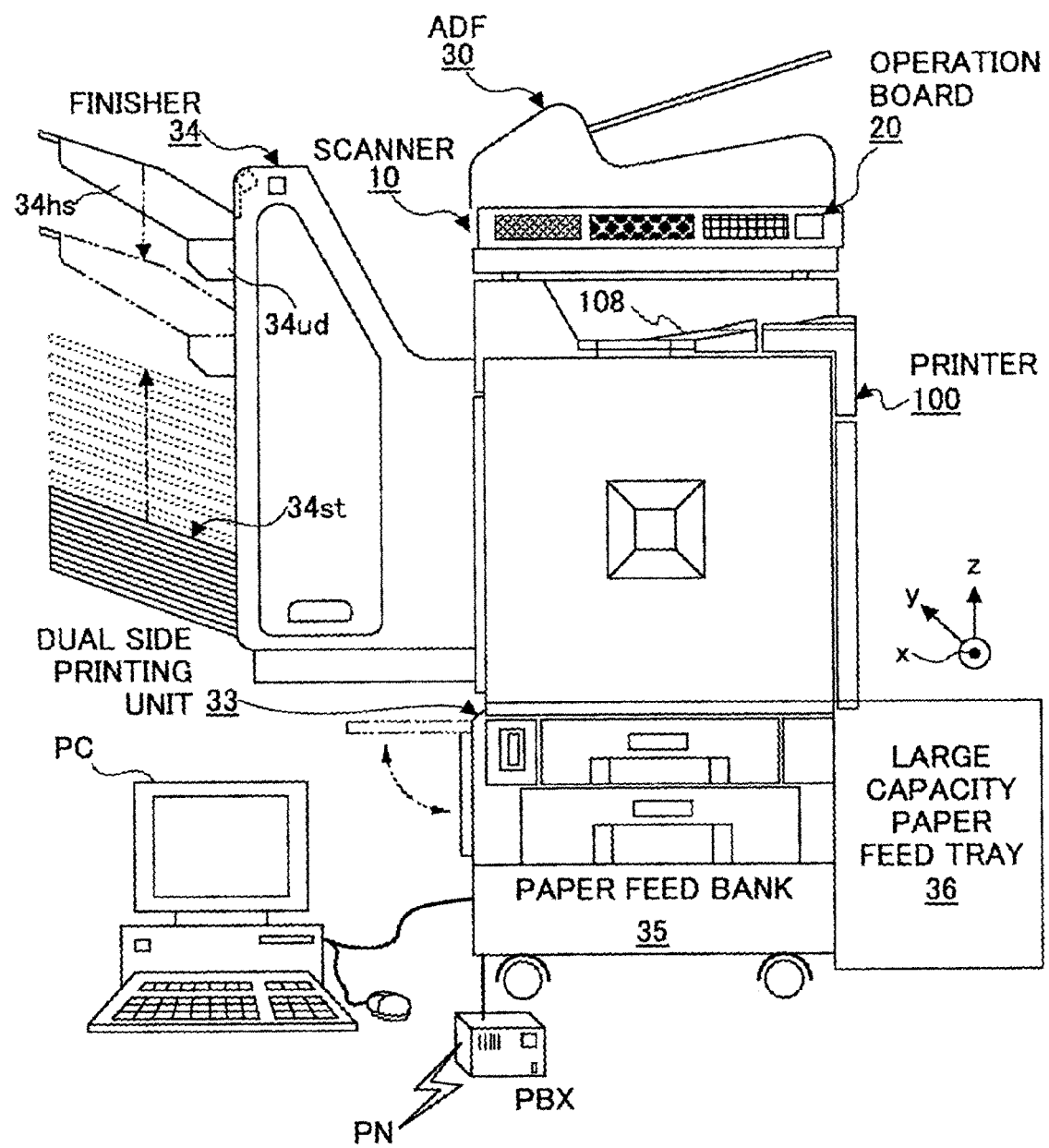
FIG. 1 is a diagram showing a front elevational view of a multi-function imaging apparatus according to a first embodiment of the present invention.

FIG. 1 shows an exterior view of a multi-function full color digital imaging apparatus according to a first embodiment of the present invention. This full color imaging apparatus includes an automatic document feeder (ADF) 30, an operation board 20, a color scanner 10, a color printer 100, and a paper feed bank 35. The color printer 100 includes a finisher 34 with a stapler and trays that hold sheets of paper with reproduced images, a dual side printing unit 33, and a large capacity paper feed tray 36.

An image data processing apparatus ACP (see FIG. 4) implemented in this digital imaging apparatus is connected to a LAN (local area network), which in turn is connected to a PC (personal computer). A facsimile control unit FCU (see FIG. 4) is connected to an exchanger PBX (see FIG. 1), which in turn is connected to a public circuit PN (facsimile communication circuit). Also, in this color printer 100, the printed sheets of paper are delivered on a delivery tray 108 or the finisher 34.

Figure 2:
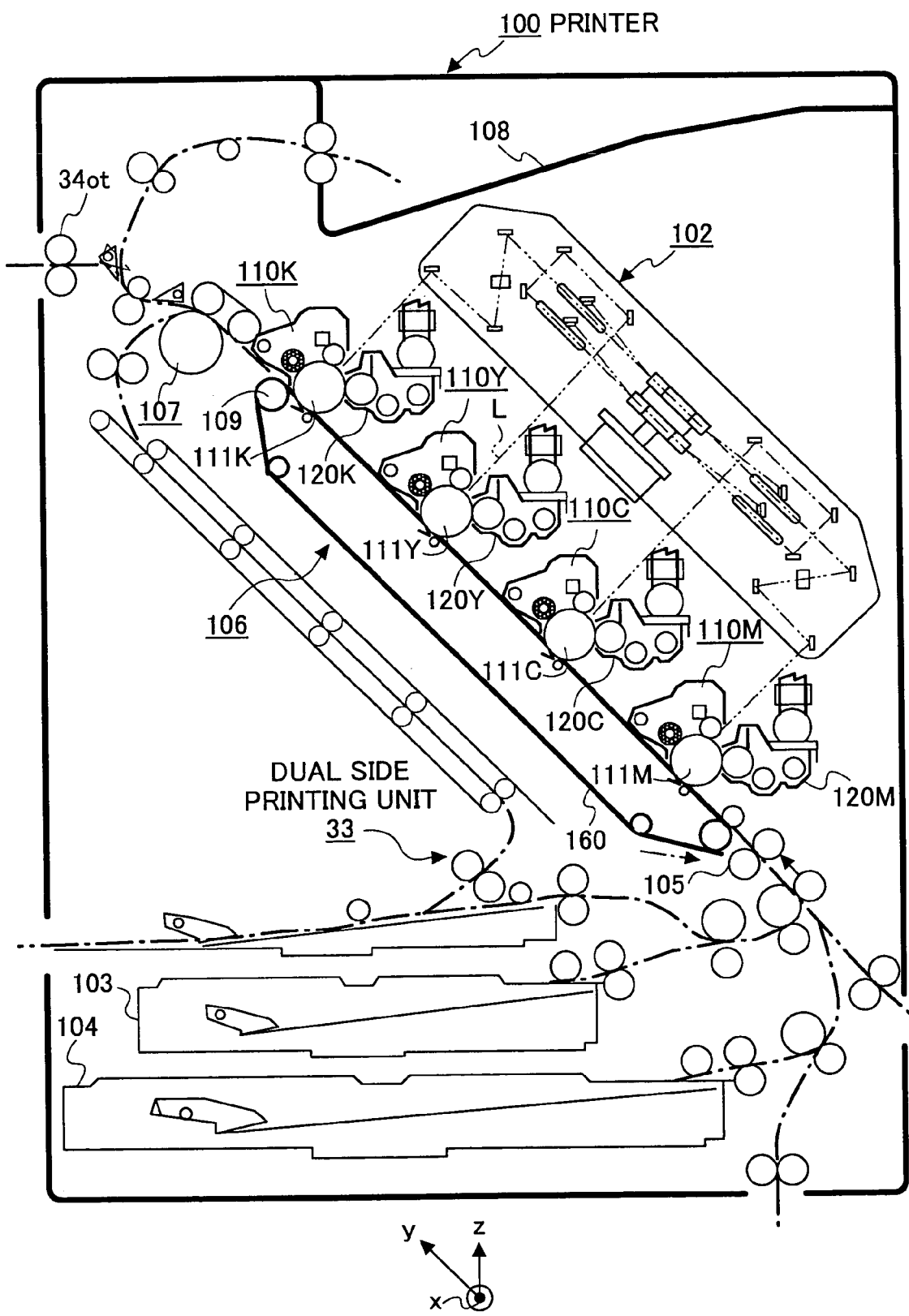
FIG. 2 is a cross-sectional view diagram illustrating an image reproducing mechanism of a printer shown in FIG. 1.

FIG. 2 shows the structural configuration of the color printer 100. The color printer 100 according to this embodiment is a laser printer. This laser printer 100 has four sets of toner image forming units each forming a toner image of magenta (M), cyan (C), yellow (Y), and black (K), respectively. The toner image forming units are arranged in this order along the moving direction of the transfer paper (direction y extending from the lower right hand side to the upper left hand side in FIG. 2). Thus, the color printer shown in FIG. 2 is a four-drum type full color imaging apparatus.

The toner image forming units of the colors magenta (M), cyan (C), yellow (Y), and black (K) each have a photoconductor unit 110 M, 110 C, 110 Y, and 110 K implementing a photoconductor drum 111 M, 111 C, 111 Y, and 111 K, respectively, and a developing unit 120 M, 120 C, 120 Y, and 120 K, respectively. Also, the toner image forming units are arranged at a predetermined pitch along the transfer paper moving direction y (sub scanning direction) and the rotation axes of the respective photoconductor drums 111 M, 111 C, 111 Y, and 111 K implemented in the photoconductor units are parallel to the horizontal x axis (main scanning direction).

Also, the laser printer 100 includes an optical writing unit 102 that performs laser scanning, paper feed cassettes 103 and 104, a pair of resist rollers 105, transfer belt unit 106 having a transfer carrier belt 160 that supports and carries the transfer paper so that it passes through each transfer position of the toner image forming units, a fixing unit 107 of the belt fixing type, a delivery tray 108, and dual side printing (side reversing) unit 33. The laser printer 100 may also include a manual tray, a toner replenishing container, and a residual toner bottle (not shown), for example.

The optical writing unit 102 includes a light source, a polygon mirror, an f-θ lens, and a reflection mirror, for example. This optical writing unit 102 scans a laser beam in the x directions and irradiates the laser beam on the surface of each photoconductor drum 111 M, 111 C, 111 Y, and 111 K based on input image data. Also, the chained lines in bold shown in FIG. 2 indicate the carrier paths of the transfer paper. The transfer paper supplied from the paper feed cassettes 103 and 104 is carried by the carrier rollers while being guided by a carrier guide (not shown) and is sent to the pair of resist rollers 105. The pair of resist rollers 105 sends transfer paper to the transfer carrier belt 160 at a predetermined timing. Then the transfer paper passes through each transfer position of the toner image forming units while being supported by the transfer carrier belt 160.

Then, the toner images formed by each of the photoconductor drums 111 M, 111 C, 111 Y, and 111 K of the toner image forming units are transferred to the transfer paper supported and carried by the transfer carrier belt 160, and thus the toner images are combined on the transfer paper to form a color image. Then, the transfer paper with the color image is sent to the fixing unit 107. Thus, in this example, a direct transfer is performed in transferring the toner image on the transfer paper. When the transfer paper passes through the fixing unit 107, the toner images are fixed to the transfer paper. The transfer paper with the fixed toner images (color image) is then discharged or supplied to the delivery tray 108, the finisher 36, or the dual side printing unit 33.

In the following, the yellow (Y) toner image forming unit will be described. It will be appreciated that the structures of the other toner image forming units are identical to that of the yellow (Y) toner image forming unit. As described above, the yellow (Y) toner image forming unit includes the photoconductor unit 110 Y and the developing unit 120 Y. The photoconductor unit 110 Y also includes a brush roller that applies lubricant material on the surface of the photoconductor drum 111 Y, an oscillating blade that cleans the surface of the photoconductor drum 111 Y, an electrostatic remover lamp that irradiates light on the photoconductor drum 111 Y, and a non-contact charge roller that evenly charges the surface of the photoconductor drum 111 Y, for example.

At the photoconductor unit 110 Y, a laser beam L that is modulated based on the print data and deflected by the polygon mirror at the optical writing unit 102 is scanned and irradiated on the surface of the photoconductor drum 111 Y that has been evenly charged by the charge roller with an alternating voltage. In this way, an electrostatic latent image is formed on the surface of the photoconductor drum 111 Y. The latent image on the surface of the photoconductor drum 111 Y is developed at the developing unit 120 Y to produce a yellow (Y) toner image. This yellow (Y) toner image formed on the photoconductor drum 111 Y is transferred onto the transfer paper at the transfer position on the transfer carrier belt 160 when the transfer paper passes through this transfer position. Then, a predetermined amount of lubricant material is applied on the surface of the photoconductor drum 111 Y by the brush roller, after which the surface is cleaned with the oscillating blade. Then, the electrostatic is removed by the light irradiated from the electrostatic remover lamp so that a next electrostatic latent image can be formed according to the same procedures.

The developing unit 120 accommodates a two-component developing material including a magnetic carrier toner and a negative charge toner. The developing unit 120 Y includes a developing roller that is arranged to be partially exposed from an opening at the photoconductor drum side of the developing unit 120 Y, a carrier screw, a doctor blade, a toner sensitivity sensor, and a powder pump, for example. The developing material contained in the developing unit 120 Y is frictionally charged by being stirred and the material is carried by the carrier screw. Then, a portion of the developing material is sustained on the surface of the developing roller. The doctor blade controls the layer thickness of the developing material on the surface of the developing roller so that the material is evenly spread. The toner particles in the developing material on the surface of the developing roller are placed on the photoconductor drum 111 Y. In this way, the toner image corresponding to the static latent image is formed on the photoconductor drum 111 Y. The toner density of the developing material in the developing unit 120 Y is detected by a toner density sensor. When the density is insufficient, the powder pump is activated and the toner is replenished.

The transfer carrier belt 160 of the transfer belt unit 106 is stretched over four grounded support rollers and is rotated so as to pass through the transfer positions facing the photoconductor drums 111 M, 111 C, 111 Y, and 111 K of each of the toner image forming units. One of the four support rollers is indicated by the numeral 109 in FIG. 2, and this corresponds to an exit roller. Another support roller positioned at the tip of a direction indicated by a two-dotted arrow in this drawing is an entrance roller that is at the starting point of the transfer paper moving direction, and this entrance roller is arranged to come in contact with an electrostatic adsorption roller that is charged with a predetermined voltage by a power source. The transfer paper passing between these two rollers is electrostatically adsorbed onto the transfer carrier belt 160. The exit roller 109, which is the support roller at the end of the belt with respect to the transfer paper moving direction, is a drive roller that drives the transfer carrier belt 160 by friction, and this exit roller 109 is connected to an excitation source (not shown). Further, at the outer periphery of the transfer carrier belt 160, a bias roller charged by the power source with a predetermined voltage for cleaning the transfer carrier belt 160 is arranged to be in contact with the transfer carrier belt 160. This bias roller removes alien substances such as toner stuck to the transfer carrier belt 160.

Also, transfer biasing members are provided so that contact members facing the photoconductor drums 111 M, 111 C, 111 Y, and 111 K are arranged to be in contact with contact portions at the inner surface of the transfer carrier belt 160 (not shown). The biasing members are fixed mylar brushes, for example, and transfer bias is supplied from each transfer biasing power source. Owing to the transfer bias applied by the transfer biasing members, an electric charge is supplied to the transfer carrier belt 160, and at each transfer position, a transfer electric field with a predetermined intensity is generated between the transfer carrier belt 160 and the surface of the respective photoconductor drum 111 M, 111 C, 111 Y, and 111 K.

Paper carried by the transfer carrier belt 160 and having each of the color toner images generated at the photoconductor drums 111 M, 111 C, 111 Y, and 111 K transferred thereon is sent to the fixing apparatus 107. At the fixing apparatus 107, the toner images are heated and pressed so that the toner images are thermally fixed on the paper. After the thermal fixing, the paper is sent to the finisher 34 at the left side of the printer apparatus via a delivery opening 34 ot that leads the paper to the finisher 34. Alternatively, the paper may be delivered to the delivery tray 108 at the top of the printer apparatus.

Referring back to FIG. 1, the finisher 34 includes a slidable stocker tray 34 hs and a set of sorting trays 34 st. The printer has a stocker delivery mode for delivering paper (i.e., printed paper, or transferred paper) to the slidable stocker tray 34 hs and a sorter delivery mode for delivering printed paper to the sorting trays 34 st.

The paper being delivered from the printer 100 to the finisher 34 is carried in an upper left hand side direction. Then, the paper makes a U turn so that the paper is directed downward. Then, the paper is delivered according to the set printer mode. Namely, when the printer mode is set to the stocker delivery mode the paper is delivered to the slidable stocker tray 34 hs via the delivery opening 34 ot, and when the printer mode is set to a sorter delivery mode the paper is delivered to the designated sorter tray 34 st.

Further, when the sorter delivery mode is set, the delivery controller in the finisher 34 activates the sorter trays 34 st to be in position for use (the positions indicated by dotted lines in FIG. 1 where the sorter trays 34 are spaced apart from one another) from a standby position in which the sorter trays 34 are piled one on top of the other at the bottom. Additionally, there are two ways of sorting the delivered paper according to the sorter delivery mode; booklet sorting and page sorting. When the sorter delivery mode is set to booklet sorting, sheets of transferred paper with the same image printed thereon are each delivered to a different sorter tray 34 st. On the other hand, when the sorter delivery mode is set to page sorting, each sorter tray 34 st is assigned to a particular image and sheets of transferred paper with the same image are delivered to the same sorter tray 34 st.

Figure 3A:
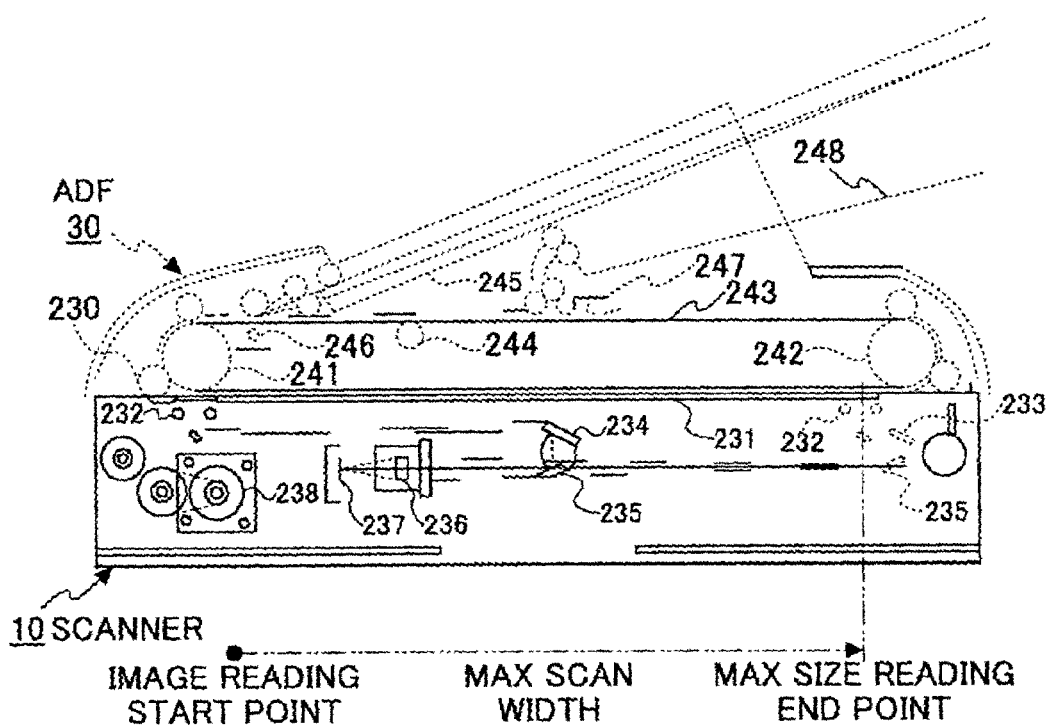
FIG. 3A is a cross-sectional view diagram illustrating an image reading mechanism of a document scanner shown in FIG. 1.

FIG. 3A shows a cross-sectional view of the image scanner 10 and the automatic document feeder apparatus (ADF) 30. A document placed on a glass document table 231 is irradiated by irradiation lamps 232 (232a and 232b in FIGS. 5 and 6). Then, the reflection light of the document (image light) is reflected by a first mirror 233 so that the light is directed parallel to the sub scanning direction (direction from left to right in FIG. 3). The irradiation lamps 232 and the first mirror 233 are mounted on a first carriage (not shown) that is driven at a predetermined speed in the sub scanning direction. A second mirror 234 and a third mirror 235 are mounted on a second carriage (not shown) that is driven at half the speed of the first carriage in the same direction (sub scanning direction). The image light reflected by the first mirror 233 is reflected by the second mirror 234 to be directed downward (direction z in FIGS. 1 and 2), and this light is then reflected by the third mirror 235 to be redirected in the sub scanning direction. Then, the image light is condensed by a lens 236, irradiated on a CCD 37, and converted into electric signals. The first and second carriages move back (return) and forth (image scanning) along the sub scanning direction using a carriage motor 238 as a drive source.

At a home position, which corresponds to the returning positions of the carriages, a standard white board 230 is arranged to be irradiated by the irradiation lamps 232. The standard white board 230 is used in processing irradiation adjustment data and shading compensation data for the irradiation lamps 232. Specifically, the reflection light of the standard white board 230 is read by the CCD 237. The scanner 10 includes a document detection sensor for detecting the size of the document placed on the glass document table 231, a home position sensor for detecting the home position (base position) of the carriages, and a pressure board sensor for detecting whether a pressure board is in an opened or closed state.

The ADF 30 may be mounted on the scanner 10. The ADF 30 is arranged to be detachable from the scanner 10, and when the ADF 30 is detached, a document press unit (not shown) is mounted on the glass document table 231. The document press unit can be opened and closed from the glass document table 231, and a document is placed on the glass document table 231 manually by an operator.

The document placed on a document tray 245 of the ADF 30 is delivered onto a carrier belt 243 by a pick-up roller and a pair of resist rollers. Herein, an adsorbing charger 246 is energized so that it charges the carrier belt 243 with electricity. Owing to the electrostatic power from this electrical charge, the document delivered onto the carrier belt 243 is drawn to the carrier belt 243. The carrier belt 243 is stretched around a drive roller 241, a driven roller 242, and a tension roller 244. When the drive roller 241 rotates in a counter-clockwise direction, the carrier belt 243 along with the document stuck to the carrier belt 243 is delivered onto the glass document table 231. It is noted that the drive roller 241 is driven by a carrier motor (not shown).

Figure 3B:
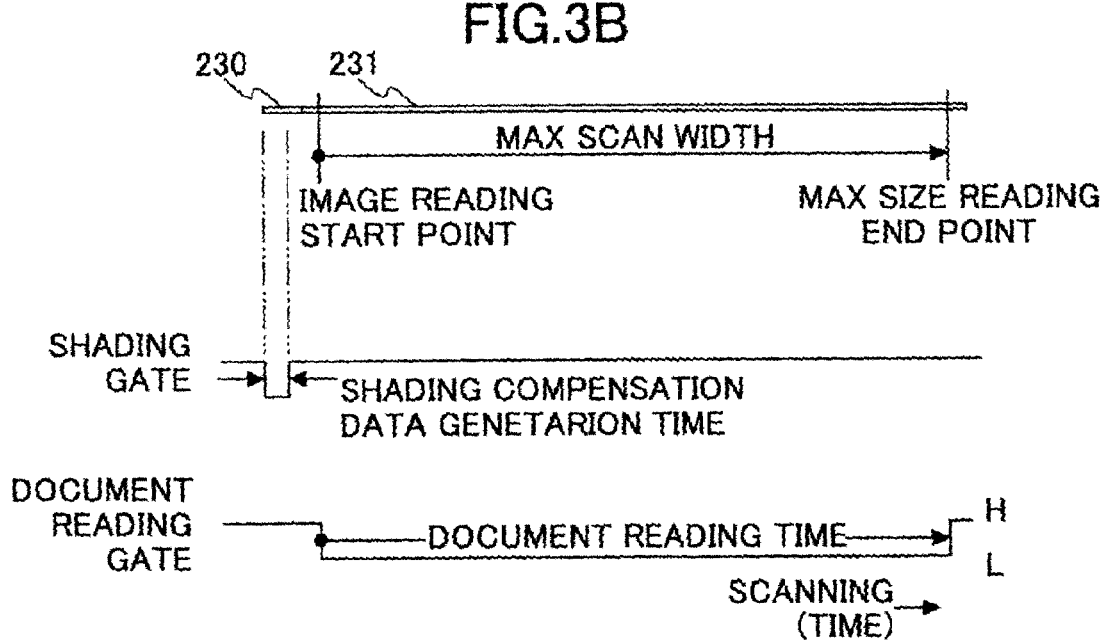
FIG. 3B is a time chart indicating a standard white board reading time and an image reading time.

FIG. 3B is a time chart indicating a standard white board reading time and an image reading time. An explanation of this drawing will be given below in relation to FIG. 7.

FIG. 4 shows a system configuration of the image processing system of the multi-function digital imaging apparatus shown in FIG. 1. This system includes a color document scanner 10, an image data processing apparatus ACP, and a color printer 100. The color document scanner 10 includes a reading unit 11, a sensor board unit SBU, and an image data output I/F (interface) 12, and is connected to an image data interface controller CDIC of the image data processing apparatus ACP. The image data processing apparatus ACP is connected to the color printer 100. The color printer 100 includes a write I/F 134 that receives recorded image data from an image processing processor (IPP) of the image data processing apparatus ACP, and an image reproducing unit 135 that prints out the image. The structural configuration of the image reproducing unit 135 corresponds to that shown in FIG. 2.

The image data processing apparatus ACP includes a parallel bus Pb, an image memory access controller IMAC, a memory module MEM, which is an image memory unit, a system controller 1, a RAM 4, a nonvolatile memory 5, a font ROM 6, an image data interface controller CDIC, and the image processing processor IPP, for example. The parallel bus Pb is connected to a facsimile control unit FCU. The system controller 1 is connected to an operation board 20.

The reading unit 11 in the color document scanner 10 for optically reading an image scans the image with the lamps 232 and generates the document image with the CCD 237 of the sensor board unit SBU. The document image, namely the reflection light of the light irradiated on the document, is converted from light to electric signals at the CCD 237 to produce R,G, B image data. Then shading compensation is performed on the converted RGB image data, and the output I/F 12 sends this data to the image data interface controller CDIC.

The image data interface controller CDIC administers image data transmission between the output I/F 12, the parallel bus Pb, and the image processing processor IPP, and establishes communication between the process controller 131 and the system controller 1, which controls the overall operation of the image data processing apparatus ACP. Also, the RAM 132 is used as a work area for the process controller 131, and the nonvolatile memory 133 stores operation programs of the process controller 131, for example.

The image processing processor IPP performs separation (determination of text region and photo region of an image; i.e, image region separation), real time thresholding, scan gamma conversion, filtering, color compensation, scaling, image processing, printer gamma conversion, and grey scale processing. The image processing processor IPP is a programmable computation processing means for realizing various image processes. Image data input to the image data interface controller CDIC from the scanner 10 are transmitted to the image processing processor IPP where signal degradation occurring in the optical system and in the quantization of the image data into digital signals (signal degradation in the scanner system) are compensated. Then the compensated image data is sent back (output) to the image data interface controller CDIC.

The image memory access controller IMAC controls the writing/reading of image data to/from the memory module MEM. The system controller 1 controls the operation of each component part connected to the parallel bus Pb. Also, the RAM 4 is used as the work area for the system controller 1, and the nonvolatile memory 5 stores operation programs of the system controller 1.

The operation board 20 inputs processes that are to be performed by the image data processing apparatus ACP. For example, the operation board 20 inputs a type of image processing (e.g., copying, facsimile transmission, image reading, printing) and a number of pages to be produced. In this way, image data control information is input to the image data processing apparatus ACP.

The image read by the reading unit 11 of the scanner 10 is converted into image signals by the CCD in the sensor board unit SBU. Then an A/D conversion is performed on the image signals to obtain digital image data, and shading compensation is performed on this data. Then the image data are transmitted to the image processing processor IPP via the image data interface controller CDIC. The image processing processor IPP performs image compensation for correcting distortions in the image reading, such as scan gamma compensation, or filter processing, after which the resulting data are stored in the memory module MEM. Upon printing out an image based on the image data stored in the memory module MEM, RGB signals are color converted into YMCK signals at the image processing processor IPP, and image quality processing such as a printer gamma conversion, a grey scale conversion, and a grey scale adjusting process (i.e., dithering process, error diffusion process) are performed. The image data obtained after image quality processing are sent to the writing I/F 134 from the image processing processor IPP. The writing I/F 134 performs laser control on the grey scale processed signals through pulse width modulation and power modulation. Then, the image data are sent to the image reproducing unit 135 where the image is reproduced on the transfer paper.

The image memory access controller IMAC realizes access control over the image data and the memory module MEM, development of image data from print data produced by a personal computer PC (not shown), which is connected to a LAN, and compression/decompression of image data for efficient usage of the memory module MEM, based on the control of the system controller 1.

The image data sent to the image memory access controller IMAC are compressed and stored in the memory module MEM. The image data stored in the memory module MEM may be read out according to need. The read out image data are decompressed and reverted to the original image data before compression. The data are then transmitted back to the image data interface controller CDIC via the parallel bus Pb, and image quality processing is performed at the image processing processor IPP. The image data are then output to the writing I/F 134, and a reproduced image is formed on the transfer paper by the image reproducing unit 135.

In the imaging apparatus of this example, functions of the multi-function imaging apparatus are realized by the parallel bus Pb and the bus control performed by the image data interface controller CDIC. For example, to realize facsimile transmission, read out image data are processed at the image processing processor IPP, and the processed data are transmitted to the facsimile control unit FCU via the image data interface controller CDIC and the parallel bus Pb. The facsimile control unit FCU then performs appropriate data conversion for transmitting the data to the communication network, and transmits the data to the public circuit PN as facsimile data. To receive facsimile data, circuit data from the public circuit PN is converted into image data at the facsimile control unit FCU, which is then transmitted to the image processing processor IPP via the parallel bus Pb and the image data interface controller CDIC. In this case, the data is output to the writing I/F without performing any particular image processing processes, and the image is reproduced on the transfer paper by means of the image reproducing unit 135.

In a situation where a plurality of jobs are operable, that is, for example, when a copying function, facsimile transmission/reception functions, and a printer function can be realized at the same time, the assigning of usage rights for using the reading unit 11, the image reproducing unit 135 and the parallel bus Pb is controlled by the system controller 1 and the process controller 131. Specifically, the process controller 131 controls the image data flow, and the system controller 1 controls the overall operation of the system. Also, the operation board 20 selects a function of the digital multi-function imaging apparatus, and thus, based on the selected input made by the operation board 20, an imaging process corresponding to the copying function or the facsimile function, for example, can be set.

The system controller 1 and the process controller 131 communicate with each other via the parallel bus Pb, the image data interface controller CDIC, and a serial bus Sb. Specifically, communication between the system controller 1 and the process controller 131 is established by executing data format conversion in the image data interface controller CDIC to enable data interface between the parallel bus Pb and the serial bus Sb.

Bus interfaces, such as a parallel bus I/F 7, a serial bus I/F 9, a local bus I/F 3, and a network I/F 8, are connected to the image memory access controller IMAC. The system controller 1 is connected to various associated units via the various buses. In this way, the system controller 1 is able to maintain its independence within the image data processing apparatus ACP.

The system controller 1 controls other function units via the parallel bus Pb. Also, the parallel bus is used for image data transmission. The system controller 1 sends an operation control command to the image memory access controller IMAC for the memory module MEM to store image data. This operation control command is sent via the image memory access controller IMAC, the parallel bus I/F 7, and the parallel bus Pb.

In response to the operation control command, the image data is sent from the image data interface controller CDIC to the image memory access controller IMAC via the parallel bus Pb and the parallel bus I/F 7. Then, the image data is stored in the memory module MEM by the control of the image memory access controller IMAC.

On the other hand, when the PC calls for the printer function of the image data processing apparatus ACP, the system controller 1 may function as a printer controller, a network controller, and a serial bus controller. When the imaging operation is controlled via the network, the image memory access controller IMAC receives print output request data via the network I/F 8.

In the case of a general-purpose serial bus connection, the image memory access controller IMAC receives the print output request data via the serial bus I/F 9. The general-purpose serial bus I/F 9 may be compatible with a plurality of standards, and, for example, it may be compatible with an interface complying with the USB (universal serial bus) standard.

The print output request data from the PC is developed into image data by the system controller 1. The data is developed in an area of the memory module MEM. Font data required for the development are obtained by referring to font ROM 6 via the local bus I/F 3 and the local bus Lb. The local bus Lb also connects the system controller 1 to the nonvolatile memory 5 and the RAM 4.

In addition to the connection with an external serial port 2 for realizing connection with the PC, the serial bus Sb provides an interface for realizing transmission with the operation board 20, which functions as the operation unit of the image data processing apparatus ACP. This interface is not used for the print data to be developed; rather, it communicates with the system controller 1 via the image memory access controller IMAC to perform functions such as accepting processing procedures or displaying system status.

Data transmission and reception between the system controller 1, the memory module MEM, and the various buses are realized via the image memory access controller IMAC. Jobs using the memory module MEM are uniformly managed in the image data processing apparatus ACP.

Figure 5:
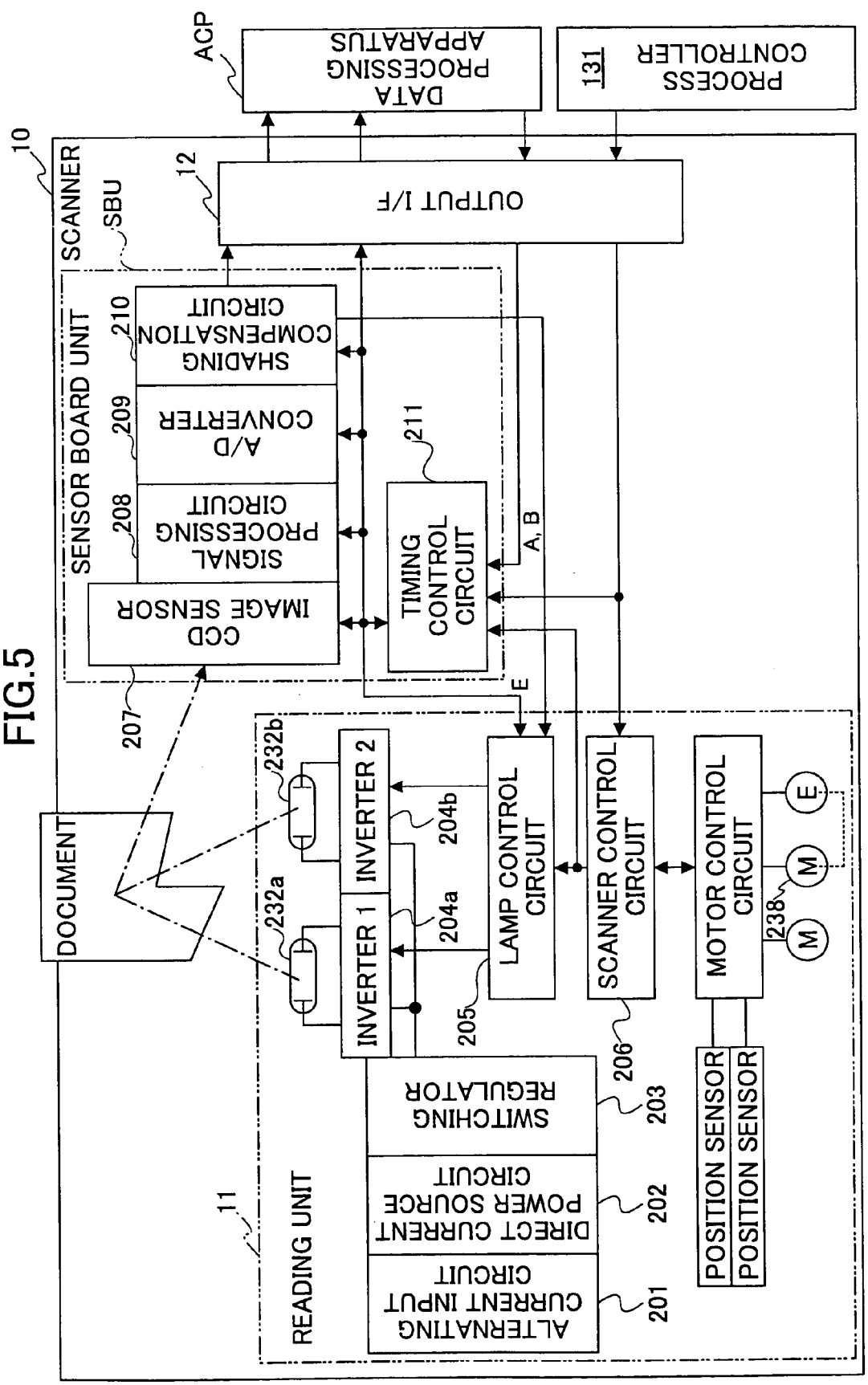
FIG. 5 is a block diagram illustrating an image reading electric circuit configuration of the document scanner shown in FIG. 1.

FIG. 5 shows an electric system configuration of the scanner 10 performing an image reading operation. Electric signals output from the CCD image sensor 207, namely analog signals, are amplified at a signal processing circuit 208, and converted into digital image signals at an A/D converter 209. Then, a compensation process is performed on the digitally converted image signals by a shading compensation circuit 210, and the resulting signals are output to the image data processing apparatus ACP (i.e., image processing processor IPP).

The scanner control circuit 206 controls a lamp control circuit (light source drive controller) 205, a timing control circuit 211, and a motor control unit according to instructions from the process controller 131. The lamp control circuit 205 performs on/off control of the exposure lamps 232a and 232b, which are discharge tubes, according to instructions from the scanner control circuit 206. Also, the lamp control circuit 205 sets the brightness (time-series average value or smoothed value) of light irradiated by the exposure lamps 232a and 232b to an illumination level (amount of light) designated by the shading compensation circuit 210.

In the following description, the exposure lamps 232a and 232b may be collectively referred to as exposure lamp 232. Similarly, inverters 204a and 204b described below may be collectively referred to as inverter 204.

A motor control unit controls a sub scanning drive motor 238 and an ADF (automatic document feeder) motor according to instructions from the scanner control circuit 206. Further, a rotary encoder (E) is connected to a drive axis of the sub scanning drive motor 238. A position sensor determines whether or not the mobile component parts of the scanner and the ADF are positioned at their respective base positions.

The timing control circuit 211 generates various signals according to instructions or control signals from the scanner control circuit 206, the image data processing apparatus ACP (i.e., system controller 1), and the process controller 131. Specifically, when an image reading operation is initiated, transmission gate signals E (at a low level L during transmission) for transmitting data of one line to a shift register, and shift clock pulses that output the data contained in the shift register one bit at a time, are supplied to the CCD image sensor 207. Also, image synchronization clock pulses CLK, line synchronization signals LSYNC, and main scanning valid duration signals LGATE are output to the image data processing apparatus ACP. The image synchronization clock pulses CLK are roughly identical to the shift clock pulses supplied to the CCD image sensor 207. Also, the line synchronization signals LSYNC correspond to line synchronization signals MSYNC output by the beam sensor of the image reproducing unit 135 of the printer 100. The line synchronization signals MSYNC cannot be output when image reading is not being performed. Main scanning valid duration signals LGATE are at a high level H when the image signals output by the CCD image sensor 207 can be considered valid.

The scanner control circuit 206 receives an instruction to start image reading from the process controller 131. In response, the scanner control circuit 206 controls the timing control circuit 211, initiates the image reading of the CCD image sensor 207, lights the exposure lamps 232a and 232b, and activates the sub scanning drive motor 238. Also, the sub scanning valid duration signals FGATE are set to a high level H. The level of the signals FGATE will be lowered to level L after a period of time required for scanning a maximum reading length (the length of the longer side of an A3 size paper sheet in this example) in the sub scanning direction passes from the time the signal level is set to H.

Right after turning on the power source, the scanner control circuit 206 positions the exposure lamps 232a and 232b to their home positions so that they irradiate light on the standard white board 230. The process controller 131 drives the CCD image sensor 207 in order to warm up the exposure lamps 232a and 232b and to check the functions of each electric circuit component, and supplies lighting command signals F to the scanner control circuit 206 (lighting command: low level L). In this way, the exposure lamps 232a and 232b are lit. After the warm-up period, the exposure lamps 232a and 232b will have stable illumination levels. Then, the shading compensation circuit 210 starts 'shading compensation control' SCC, and at its initiation, the light level (illumination level) of the exposure lights is adjusted. Details of this procedure are described below.

Figure 6:
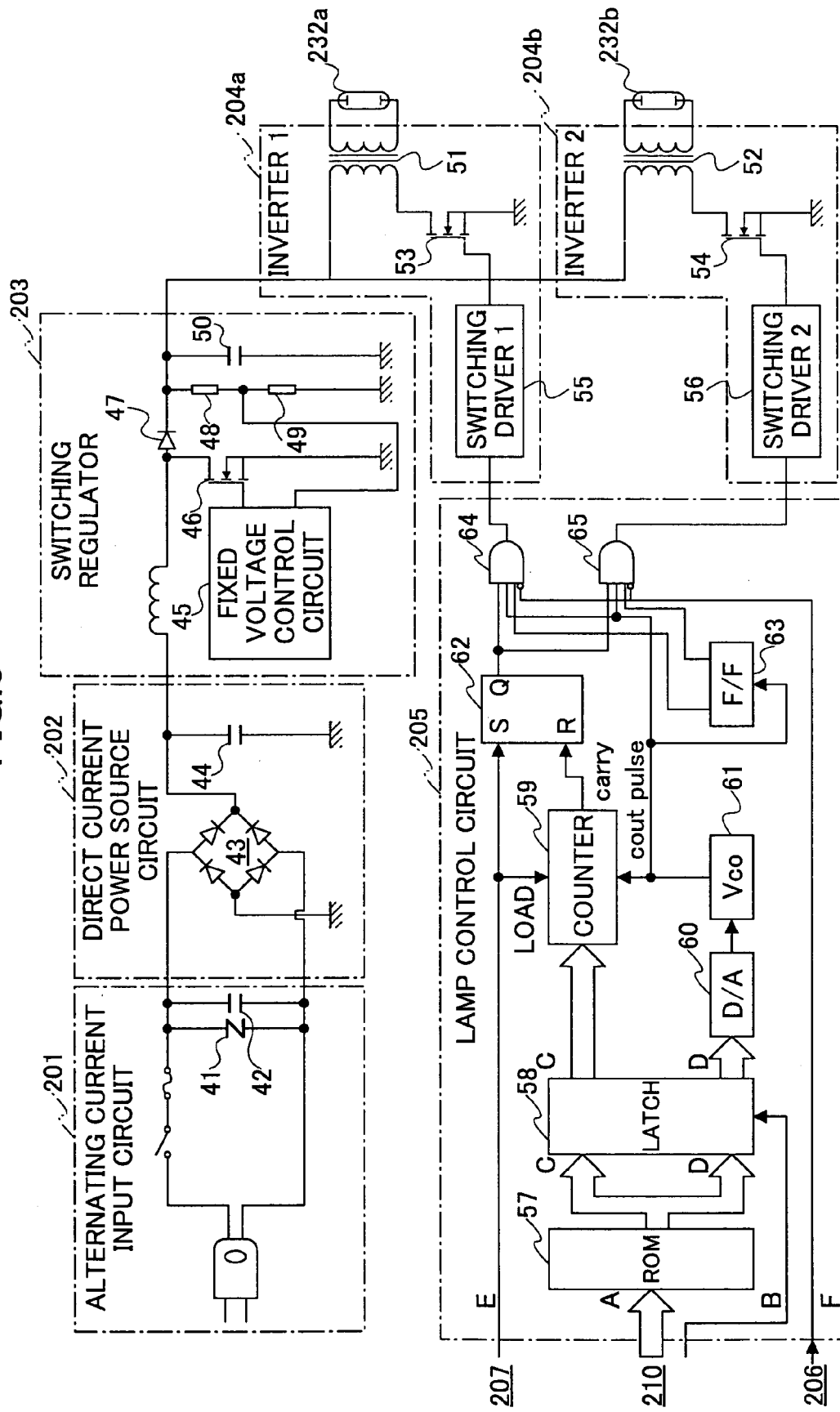
FIG. 6 is a block diagram illustrating power source circuits of exposure lamps shown in FIG. 5, and functions relating to a light level controlling process performed by a lamp control circuit.

FIG. 6 shows electric circuit configurations for supplying electricity to the exposure lamps 232a and 232b, and electric circuit configurations of the lamp control circuit 205 for adjusting the light level of the exposure lamps 232a and 232b to a designated value.

According to this drawing, a commercial alternating voltage is supplied to a direct current power source circuit 202 via an alternating current input circuit 201 that includes a barrister 41 for protection against excess voltage and a condenser 42 for cutting high frequency noise. The voltage is then commutated at a diode bridge 43 and smoothed at a condenser 44. Then, the direct current power source circuit 202 outputs the resulting direct current voltage to a high voltage chopper type switching regulator 203.

In turn, the switching regulator 203, which is a AC/DC high voltage converter, feeds back the output voltage to a fixed voltage control circuit 45 using voltage distributed resistors 48 and 49, and the chopping frequency (pulse period that turns on a FET 46) is manipulated so that the voltage of the condenser 50 (output voltage) is adjusted to a designated value at the fixed voltage control circuit 45. The output voltage of the switching regulator 203 is supplied to one end of a primary coil of a high voltage transformer 51 included in an inverter 204a and to one end of a primary coil of a high voltage transformer 52 included in an inverter 204b. The other ends of the primary coils of the high voltage transformers 51 and 52 are connected to FETs 53 and 54, respectively. The FETs 53 and 54 are turned on by one-shot (mono-multi vibrator) type switching drivers 55 and 56, respectively.

The lamp control circuit 205 includes a ROM 57 that stores a table (conversion data/address) for converting light level designating data A supplied by the shading compensation circuit 210 into an inverter driving pulse number (number of lighting pulses generated within one period of the transmission gate signal E) C and a pulse frequency (frequency of lighting pulse) D. Herein, the inverter driving pulse number C corresponds to the number of pulses lighting the exposure lamp 232 generated during a time the transmission gate signal E is at a high level H (accumulation time) in one period. On the other hand, during the time the transmission gate signal E is at a low level L (transmission time), a light-to-electricity conversion voltage generated by pixels of one line is transmitted to an image outputting shift register in the CCD image sensor 207. The accumulation time corresponds to a continuous period of time within a period of the transmission gate signal E in which the signal E is at a high level H, and during this time period, electrical charges corresponding to the light level of the exposure lamps are accumulated or discharged on the pixels being subjected for light-to-electricity conversion. The pulse frequency D corresponds to the frequency of the inverter driving pulse (pulses per second).

Upon outputting new light level designating data A to update the light level data in the lamp control circuit 205, the shading compensation circuit 210 supplies latch control pulses (data A reading synchronization pulses) B to the lamp control circuit 205. The lamp control circuit 205 determines the read address of ROM 57 using the light level designating data A from the shading compensation circuit 210, and reads out the conversion data C and D. When the lamp control circuit 205 receives the latch control pulses B, it stores the conversion data C and D being read at the time to a latch 58. It is noted that the greater the value of the light level designating data A (the ROM read address) is, the greater the inverter driving pulse number C and the pulse frequency D read from the ROM 57 will be.

The inverter driving pulse data C read out from the ROM 57 show values roughly within a range of 16~64, and the data C are supplied to a load data input terminal of a counter 59. The pulse frequency data D read out from the ROM 57 are converted into analog signals (voltage level) at a D/A converter 60 and supplied to a voltage control variable frequency pulse generator 61. The pulse generator 61 generates a set of pulses with narrow pulse widths having a frequency that is roughly 8~32 times the frequency of the transmission gate signals E, and supplies the pulses to the counter pulse input terminal of the counter 59. The frequency of the pulses is determined by the pulse frequency data D; that is, the frequency will be high when the value of data D is large and low when the value of data D is small.

When the scanner control circuit 206 supplies lighting instruction signals F that are at a low level L (instructing the lighting of the exposure lamp 232), each of the inverting input terminals at AND gates 64 and 65 in the lamp control circuit 205 (marked by a small circle in the drawing) are turned on. When the transmission gate signals E are switched from the transmission instructing level L to a transmission non-instructing level H in this state, the counter 59 loads the data C and starts counting the number of pulses generated by the pulse generator 61. Also, a flip flop 62 is set at the pulse count starting point of the pulse counter 59 in synchronization with the transmission gate signals E, and its Q outputs are reversed from the low level L to the high level H. In turn, one input terminal at each of the AND gates 64 and 65 is turned on. Also, pulses generated by the pulse generator 61 and outputs of a D flip flop 63 are supplied to the two remaining gate input terminals of the AND gates 64 and 65.

The D flip flop 63 reverses the signal levels of Q and Q-bar outputs (Q bar: Q with overline; i.e., opposite signal of Q output signal) each time one pulse is received from the pulse generator 61. Specifically, the Q outputs from the D flip flop 63 are supplied to the AND gate 64, and the Q-bar outputs are supplied to the AND gate 65. Thus, a sequence of pulses generated by the pulse generator 61 is output in a manner such that the even numbered pulses (counting from the first pulse of the sequence) are output by the AND gate 64 and the odd numbered pulses are output by the AND gate 65, for example.

The switching driver 55 turns on the FET 53 for a fixed period of time in response to each of the even numbered pulses output by the AND gate 64, and thus, the exposure lamp 232a is lit in synchronization with each of the even numbered pulses. The switching driver 56 turns on the FET 54 for a fixed period of time in response to each of the odd numbered pulses output by the AND gate 65, and thus, the exposure lamp 232b is lit in synchronization with each of the odd numbered pulses. In this way, the exposure lamps 232a and 232b are interchangeably lit by the lighting pulses.

The counter 59 counts both the odd numbered pulses and the even numbered pulses and generates carry signals (count signals) when the count value reaches a load value (number of pulses) C. During the falltime of the carry signals, the flip flop 62 is reset and the Q outputs are switched to the level L. In this way, the AND gates 64 and 65 are turned off and the switching drivers 55 and 56 stop outputting the lighting pulses.

When the transmission gate signals E (at level L) are generated again and the signal level is switched from the transmission instructing level L to transmission non-instructing level H, the data C is loaded to the counter 59 and pulses are output to the switching drivers 55 and 56 along with the designated number of pulses (C). That is, when the exposure lamps 232a and 232b are lit interchangeably to represent the transmission gate signals E within one period, the lighting pulses light the exposure lamps 232a and 232b for a total number of times designated by the data C with a frequency designated by the data D. The light level designating data A determining the data C and D are generated by the shading compensation circuit 210 and supplied to the lamp control circuit 205.

When the lighting instruction signals F supplied by the scanner control circuit 206 are switched to the level H (light-off instruction), the AND gates 64 and 65 are turned off, and lighting trigger pulses are no longer supplied to the switching drivers 55 and 56. Thus, the exposure lamps 232a and 232b are no longer lit.

Figure 7:
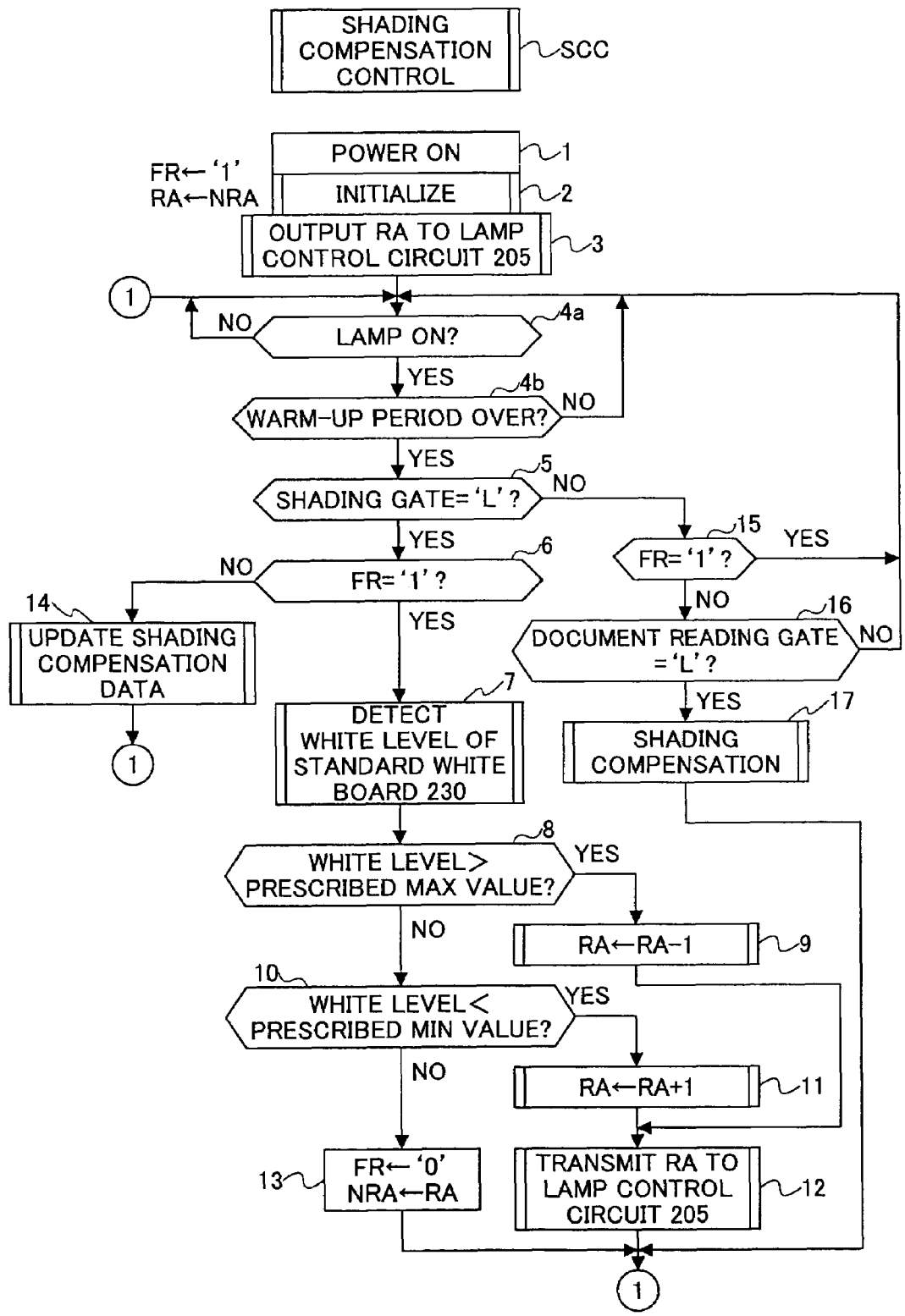
FIG. 7 is a flowchart illustrating a part of a data processing flow; namely, a shading compensation control process performed by a shading compensation circuit shown in FIG. 5.

FIG. 7 is a flowchart illustrating the control function of the shading compensation circuit 210 of FIG. 5. When the power source is turned on, the shading compensation circuit 210 is initialized so that the circuit can operate. Herein, a value '1' representing an instruction for light level adjustment of the exposure lamps is written in a register FR, and the light level designating data NRA saved in a register NRA (one memory region) located in a nonvolatile memory are written in a light level designating register RA (one memory region) located in a RAM (steps 1 and 2). Then, the data RA in the light level designating register RA are transmitted to the lamp control circuit 205 as the above-described light level instruction data A, and lighting signals F are supplied to read the document (step 3).

The lamp control circuit 205 determines the read address based on the light level instruction data RA (A), reads the stored data C and D corresponding to the determined read address from the ROM 57, synchronizes the read out data C and D with the lighting signals F, and latches the data in the latch 58 (step 3). In this way, the scanner control circuit 206 arranges the lighting instruction signals F to be at the lighting instructing level H. Further, when the timing control circuit 211 starts supplying the transmission gate signals E, the exposure lamps 232a and 232b will be interchangeably lit by the pulses as described above.

Then, after the warm-up period of the exposure lamps 232a and 232b, the shading compensation circuit 210 detects the white level of the standard white board 230 when shading gate signals are at the level L; that is, when exposure lamps are at the standard white board reading positions (steps 4a, 4b, 5~7). In the present embodiment, the shading compensation circuit 210 averages the image data of the standard white board 230 read by the CCD image sensor 207 for a plurality of lines, and determines the line average value as the white level of the standard white board 230 (step 7). Then, the obtained white level is compared with a maximum value and a minimum value of a standard range (step 8 and 10). If the white level is above the maximum value, the value of the light level instruction data RA (A) of the register RA is decremented by 1 (step 8 and 9). If the white level is below the minimum value, the value of the light level instruction data RA (A) of the register RA is incremented by 1 (step 10 and 11). By manipulating the light level instruction data RA (A) in the manner described above, the light level instruction data RA of the light level instruction register RA can be adjusted into light level instruction data A to be transmitted to the lamp control circuit 205, and the read instruction signals F can be supplied (step 12). Then the white level of the standard white board 230 is detected again and it is determined whether or not the detected value is within the standard range (steps 4a~10).

When the detected white level value of the standard white board 230 is determined to be within the standard range, the data of the register FR is rewritten to '0' (adjustment of light level of the exposure lamps completed). Herein, the data RA in the register RA (the updated light level designating data A resulting from the light level adjustment) are written in the register NRA set in the nonvolatile memory (step 13).

When the light level adjustment (steps 4a~13) is completed, the data in the register FR will be '0'. Thus, the process moves on to 'shading compensation data updating', which is performed each time the shading gate signals are set to the level L (i.e., when the exposure lamps are at the standard white board reading positions) (step 14). However, the actual updating of the compensation data is performed after the power is turned on and once in reading a particular image for a designated number of times (pages). At other times, the data pass through a bypass route in the 'shading compensation data updating' step (step 14) to return to step 4a. Further, when actually performing the process of updating the compensation data, the image data (white level) of the standard white board 230 for a plurality of lines are read by reading each pixel position of the lines, and calculating the white level of each pixel by performing average value computation of the plurality of lines. The calculation results are then written in a line buffer memory.

During the time the exposure lamps irradiate a document, document reading gate signals are at the level L, as shown in FIG. 3B. During this time, the shading compensation circuit 210 performs 'shading compensation' on the read image data (step 17). In the present embodiment, the shading compensation circuit 210 reads out the pixel white level data of the pixel positions of read image data from the line buffer memory, and supplies the read out pixel white level data and the image data currently being read to the shading compensation ROM in the shading compensation circuit 210 as the read address. Then, the shading compensation circuit 210 reads out the compensated data stored in the shading compensation ROM, and outputs the data to the image data processing apparatus ACP via the output I/F 12. The shading compensation ROM stores various combinations of a pixel white level data value (address 1) and an image reading data value (address 2) as read addresses for each pixel position, and corresponding multiplication results obtained by multiplying the reading image data by a gain represented by the ratio between the standard white level and the pixel white level (standard white level/pixel white level). That is, the shading compensation ROM stores a look up table for the shading compensation process.

Second Embodiment

The structural configuration of a multi-function imaging apparatus according to a second embodiment is identical to that of the first embodiment, and the electrical circuit configuration of this apparatus is in most parts also identical to that of the first embodiment. However, the light level setting function of the lamp control circuit 205 and the content of the light level designating data in the shading compensation circuit 210 are different from those of the first embodiment.

Figure 8:
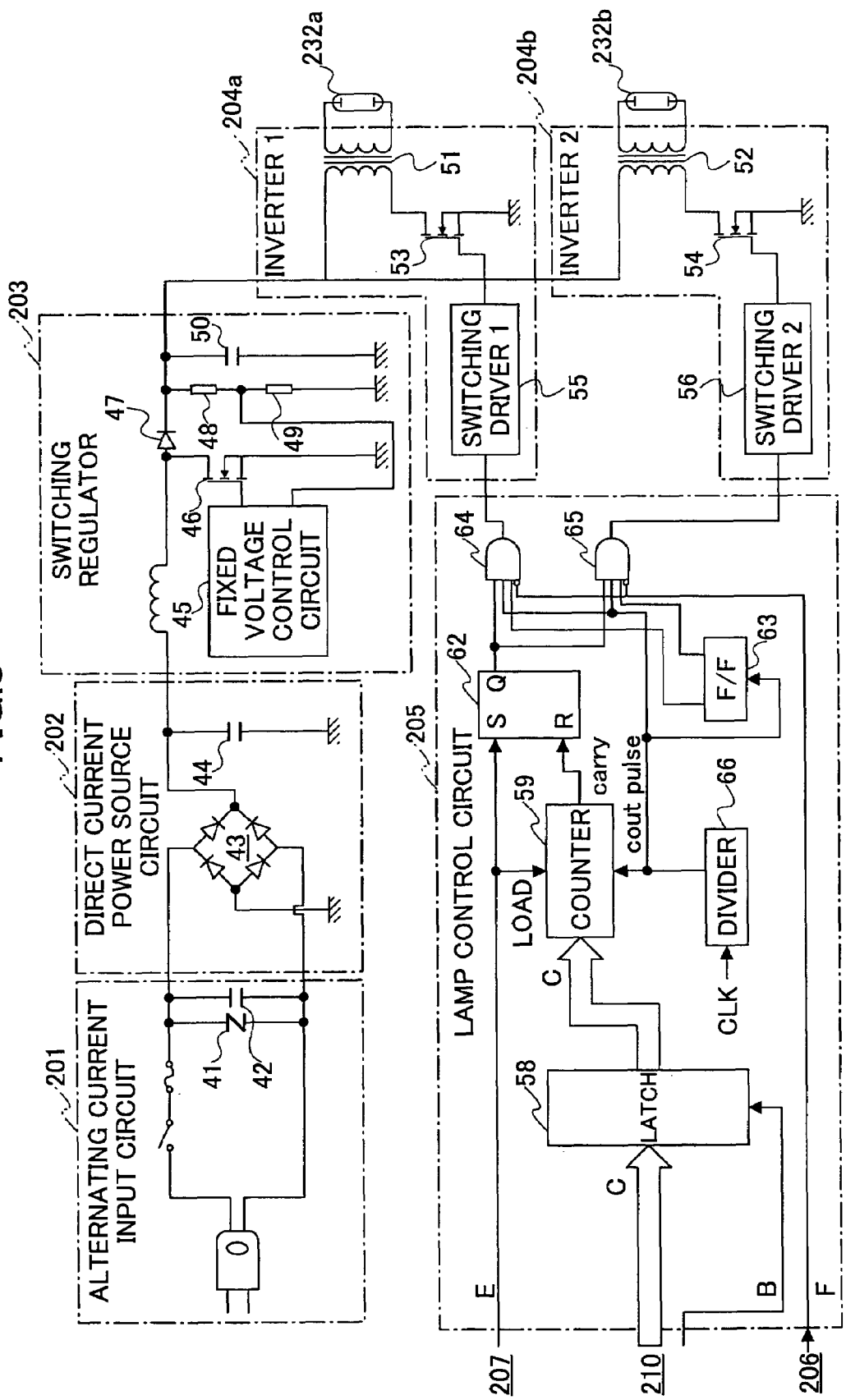
FIG. 8 is a block diagram illustrating functions relating to a light level controlling process of a lamp control circuit according to a second embodiment of the present invention.

FIG. 8 illustrates the light level setting function of the lamp control circuit 205 according to the second embodiment. In this drawing, the ROM 57 of the lamp control circuit 205 according to the first embodiment (see FIG. 6) is removed and a divider 66 is used in place of the voltage control variable frequency pulse generator 61. The divider 66 divides the frequency of the clock pulses CLK and generates pulses with a fixed frequency. The light level designating data A manipulated by the shading compensation circuit 210 only includes the inverter driving pulse number (number of lighting pulses within one period of the transmission gate signals E) C.

In the second embodiment, the shading compensation circuit 210 performs the 'shading compensation control' SCC as shown in FIG. 7; however, data for reading and writing in the register RA represent only the inverter driving pulse number C. Thus, according to the second embodiment, the inverter driving pulse number C is changed so that the read out white level of the standard white board will be within a prescribed range. Namely, since the pulse period (pulse frequency D) of the lighting pulses are fixed, the total number of times the exposure lamps 232a and 232b are lit by the lighting pulses within one period of the transmission gate signals E is changed by changing the period of the transmission gate signals E.

Third Embodiment

The structural configuration of a multi-function imaging apparatus according to a third embodiment of the present invention is identical to that of the first embodiment, and the electrical circuit configuration of this apparatus is also mostly identical to that of the first embodiment. However, the light level setting function of the lamp control circuit 205 and the content of the light level designating data in the shading compensation circuit 210 are different from those of the first embodiment.

Figure 9:
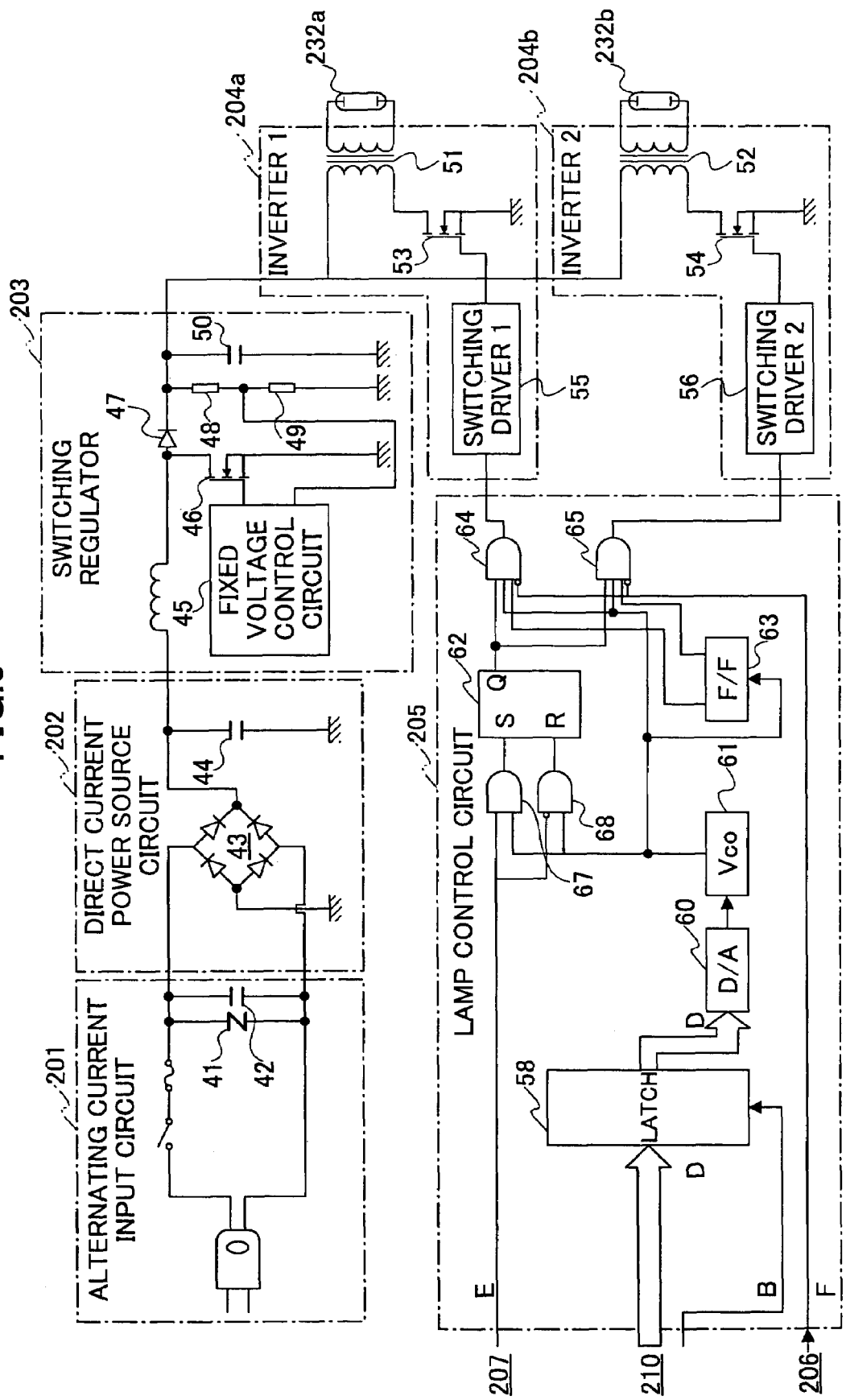
FIG. 9 is a block diagram illustrating functions relating to a light level controlling process of a lamp control circuit according to a third embodiment of the present invention.

FIG. 9 illustrates the light level setting function unit of the lamp control circuit 205 according to the third embodiment. In this drawing, the ROM 57 of the lamp control circuit 205 according to the first embodiment (FIG. 6) is removed and synchronization AND gates 67 and 68 are added so as to ensure the generation of lighting pulses within a period of the transmission gate signals E to total a whole number (transmission non-instructing period at level H).

During the time the transmission gate signals E are at the transmission non-instructing level H, the AND gate 67 outputs pulses generated by the voltage control variable frequency pulse generator 61 to a setting input terminal S of the flip flop 62, and the AND gate 68 outputs pulses generated by the voltage control variable frequency pulse generator 61 to the resetting input terminal R of the flip flop 62. In this way, the flip flop is set by the first pulse arriving after the level of the transmission gate signals E is switched from the transmission instructing level L to the transmission non-instructing level H, and the Q output of the AND gate will be at the level H. Also, the flip flop 62 is reset by the first pulse arriving after the level of the transmission gate signals E is switched from the transmission non-instructing level H to the transmission instructing level L, and the Q output of the AND gate will be at the level L.

According to the third embodiment, the light level designating data A manipulated by the shading compensation circuit 210 includes only the inverter driving pulse frequency D. That is, in this embodiment, the shading compensation circuit 210 performs 'shading compensation control' SCC as shown in FIG. 7; however, data for reading and writing in the register RA represent the inverter driving pulse frequency D. Thus, in the third embodiment, the inverter driving pulse frequency D is changed so that the white level read by the standard white board will be within a prescribed range. Namely, since the period of the transmission gate signals E is fixed, the number of times the exposure lamps 232a and 232b are lit by the lighting pulses within the period of the transmission gate signals E is changed by changing the pulse frequency D.

Further, the present invention is not limited to these embodiments, and variations and modifications may be made without departing from the scope of the present invention.

According to the present invention, during the accumulation period of the linear image sensor 207, the light source 232 is accurately driven based on a prescribed number of trigger pulses, and thus, unevenness in the exposure light of a document image within one accumulation period can be substantially eliminated. In this way, inconsistency in the output signals of the linear image sensor 207 can be reduced.

The present application is based on and claims the benefit of the earlier filing date of Japanese priority application No.2002-201398 filed on Jul. 10, 2002, the entire contents of which are hereby incorporated by reference.

What is claimed is:

1. A document reading apparatus comprising:
    a light source for irradiating a document;
    a linear image sensor for converting reflection light of the document into an electric signal;
    a light source drive controller that includes a pulse generating unit for generating a plurality of control pulses having a period that is shorter than an accumulation period of the linear image sensor, the accumulation period being indicated by a timing signal that represents the accumulation period and a non-accumulation period, and a synchronization output unit for outputting a prescribed number of trigger pulses that are in synchronization with the timing signal and the control pulses; and
    a light source driver that is arranged to drive the light source in response to the trigger pulses.

2. The document reading apparatus as claimed in claim 1, wherein:
    the synchronization output unit includes a counter that is arranged to start counting the control pulses when a level of the timing signal is switched to a level representing the accumulation period and to generate a count signal after counting the control pulses up to the prescribed number, and a gate for outputting trigger pulses that are in synchronization with the control pulses generated within a period from the time at which the counter starts counting the control pulses to the time at which the count signal is generated.

3. The document reading apparatus as claimed in claim 1, further comprising:
    a light level designator that is arranged to detect a brightness of the light source and to adjust the brightness of the light source to fall within a prescribed brightness range by setting the prescribed number of trigger pulses to a value corresponding to the prescribed brightness range.

4. The document reading apparatus as claimed in claim 3, wherein:
    the light level designator includes a standard white board that is arranged to be irradiated by the light source, the linear image sensor, which is arranged to read a white level of the standard white board, and a compensation unit that is arranged to determine whether or not the read white level of the standard white board is within the prescribed brightness range, and to update the value of the prescribed number when the read white level is above the prescribed brightness range, in which case the value is raised, and when the read white level is below the prescribed brightness range, in which case the value is lowered.

5. The document reading apparatus as claimed in claim 1, wherein:
    the pulse generating unit is a variable frequency pulse generating unit that is arranged to generate a plurality of control pulses having a frequency that is variable.

6. The document reading apparatus as claimed in claim 5, wherein:
    the synchronization output unit includes a gate that is arranged to start outputting the trigger pulses in synchronization with the control pulses generated by the variable frequency pulse generating unit when a level of the timing signal is switched to a level representing the accumulation period and to stop the outputting of the trigger pulses when the level of the timing signal is switched to a level representing the non-accumulation period.

7. The document reading apparatus as claimed in claim 5, wherein:
    the variable frequency pulse generating unit is arranged to generate a plurality of control pulses having a prescribed frequency and a period that is shorter than the accumulation period of the linear image sensor, the accumulation period being indicated by the timing signal that represents the accumulation period and the non-accumulation period; said document reading apparatus further comprising:
    a light level designator that is arranged to detect a brightness of the light source and to adjust the brightness of the light source to fall within a prescribed brightness range by setting the prescribed frequency to a value corresponding to the prescribed brightness range.

8. The document reading apparatus as claimed in claim 7, wherein:
    the light level designator includes a standard white board that is arranged to be irradiated by the light source, the linear image sensor, which is arranged to read a white level of the standard white board, and a compensation unit that is arranged to determine whether or not the read white level of the standard white board is within the prescribed brightness range, and to update a value of the prescribed frequency when the read white level is above the prescribed range, in which case the value is raised, and when the read white level is below the prescribed brightness range, in which case the value is lowered.

9. The document reading apparatus as claimed in claim 5, wherein:
    the variable frequency pulse generating unit is arranged to generate a plurality of control pulses having a prescribed frequency and a period that is shorter than the accumulation period of the linear image sensor, the accumulation period being indicated by the timing signal that represents the accumulation period and the non-accumulation period; said document reading apparatus further comprising:
    a light level designator that is arranged to detect a brightness of the light source and to adjust the brightness of the light source to fall within a prescribed brightness range by setting each of a value of the prescribed number of trigger pulses and a value of the prescribed frequency to correspond to the prescribed brightness range.

10. The document reading apparatus as claimed in claim 9, wherein:
    the light level designator includes a standard white board that is arranged to be irradiated by the light source, the linear image sensor, which is arranged to read a white level of the standard white board, and a compensation unit that is arranged to determine whether or not the read white level of the standard white board is within a brightness prescribed range, and to update the value of the prescribed number of trigger pulses and the value of the prescribed frequency when the read white level is above the prescribed brightness range, in which case the values are raised, and when the read white level range is below the prescribed brightness range, in which case the values are lowered.

11. A document reading apparatus comprising:
a light source for irradiating a document;
a linear image sensor for converting reflection light of the document into an electric signal;
light source drive control means including pulse generating means for generating a plurality of control pulses having a period that is shorter than an accumulation period of the linear image sensor, the accumulation period being indicated by a timing signal that represents the accumulation period and a non-accumulation period, and synchronization output means for outputting a prescribed number of trigger pulses that are in synchronization with the timing signal and the control pulses; and
light source driving means for driving the light source in response to the trigger pulses.

12. The document reading apparatus as claimed in claim 11, wherein:
the synchronization output means includes a counter that is arranged to start counting the control pulses when a level of the timing signal is switched to a level representing the accumulation period and to generate a count signal after counting the control pulses up to the prescribed number, and gate means for outputting trigger pulses that are in synchronization with the control pulses generated within a period from the time at which the counter starts counting the control pulses to the time at which the count signal is generated.

13. The document reading apparatus as claimed in claim 11, wherein:
the pulse generating means is a variable frequency pulse generating means that is arranged to generate a plurality of control pulses having a frequency that is variable.

14. The document reading apparatus as claimed in claim 13, wherein:
the synchronization output means includes gate means for outputting the trigger pulses in synchronization with the control pulses generated by the variable frequency pulse generating means when a level of the timing signal is switched to a level representing the accumulation period and for stopping the output of the trigger pulses when the level of the timing signal is switched to a level representing the non-accumulation period.

15. The document reading apparatus as claimed in claim 11, further comprising:
a light level designating means for detecting a brightness of the light source and adjusting the brightness of the light source to fall within a prescribed brightness range by setting at least one of a value of the prescribed number of trigger pulses and a value of a prescribed frequency of the control pulses to correspond to the prescribed brightness range.

16. A document reading apparatus comprising:
a light source positioned parallel to one side of a document to irradiate light on the document, a positional relation between the document and the light source being mechanically changeable so that an irradiated area on the document moves along the other side of the document;
a linear image sensor arranged to convert a reflected light from the document into an electrical signal corresponding to the intensity of the reflected light of the document, and to output the electric signal; and
a light source drive circuit arranged to control an on/off time of the light source to be shorter than a time obtained from dividing an accumulation period of the linear image sensor by a value m (m>1) in order to alter an exposure light level of the linear image sensor.

17. A document reading apparatus comprising:
a light source positioned parallel to one side of a document and being driven by high voltage high frequency pulses to irradiate light on the document, a positional relation between the document and the light source being mechanically changeable so that an irradiated area on the document moves along the other side of the document;
a linear image sensor arranged to convert the reflected light from the document into an electrical signal corresponding to the intensity of the reflected light of the document, and to output the electric signal; and
a light source drive circuit that is arranged to control a number of the high voltage high frequency pulses supplied to the light source within one accumulation time of the linear image sensor in order to alter an exposure light level of the linear image sensor.

18. A document reading apparatus comprising:
a light source positioned parallel to one side of a document and being driven by high voltage high frequency pulses to irradiate light on the document, a positional relation between the document and the light source being mechanically changeable so that an irradiated area on the document moves along the other side of the document;
a linear image sensor arranged to convert a reflected light from the document into an electrical signal corresponding to the intensity of the reflected light of the document, and to output the electric signal; and
a light source drive circuit that is arranged to control a period of the high voltage high frequency pulses supplied to the light source in order to alter an exposure light level of the linear image sensor.

19. An imaging apparatus comprising:
a document reading apparatus including a light source for irradiating a document, a linear image sensor for converting reflection light of the document into an electric signal, a light source drive controller that includes a pulse generating unit for generating a plurality of control pulses having a period that is shorter than an accumulation period of the linear image sensor, the accumulation period being indicated by a timing signal that represents the accumulation period and a non-accumulation period, and a synchronization output unit for outputting a prescribed number of trigger pulses in synchronization with the timing signal and control pulses, and a light source driver that is arranged to drive the light source in response to the trigger pulses;
an image processing apparatus that is arranged to convert image data output by the document reading apparatus into image output data; and
an image reproducing unit that is arranged to reproduce an image of the document on a sheet of paper based on the image output data.

20. An imaging apparatus comprising:
a document reading apparatus including a light source for irradiating a document, a linear image sensor for converting reflection light of the document into an electric signal, light source drive control means that includes pulse generating means for generating a plurality of control pulses having a period that is shorter than an accumulation period of the linear image sensor, the accumulation period being indicated by a timing signal that represents the accumulation period and a non-accumulation period, and synchronization output means for outputting a prescribed number of trigger pulses in synchronization with the timing signal and control pulses, and light source driving means for driving the light source in response to the trigger pulses;

an image processing apparatus that is arranged to convert image data output by the document reading apparatus into image output data; and image reproducing means for reproducing an image of the document on a sheet of paper based on the image output data.

* * * * *